United States Patent [19]

Koch et al.

[11] Patent Number: 4,485,136
[45] Date of Patent: Nov. 27, 1984

[54] AMBIENT TEMPERATURE REPAIR OF ELASTOMERIC ARTICLES HAVING A HOLLOW THEREIN

[75] Inventors: Russell W. Koch, Hartville; Walter R. Hausch, Akron, both of Ohio

[73] Assignee: The Firestone Tire & Rubber Company, Akron, Ohio

[21] Appl. No.: 477,454

[22] Filed: Mar. 21, 1983

[51] Int. Cl.³ .............. F16L 11/12; B32B 25/04
[52] U.S. Cl. ...................... 428/36; 138/104; 152/353 R; 152/374; 152/DIG. 12; 156/116; 156/326; 428/411.1; 428/413; 428/423.3; 428/423.9; 428/424.6; 428/424.7; 428/424.8; 428/492; 428/521; 428/523
[58] Field of Search .............. 428/423.9, 31, 424.8, 428/36, 79, 187, 424.7, 424.6, 423.3, 423.5, 411, 413, 520-522, 447, 474.4, 492, 523; 138/104; 116/278; 152/353 R, DIG. 12, 374; 156/116, 326

[56] References Cited

U.S. PATENT DOCUMENTS

| | | | |
|---|---|---|---|
| 3,644,256 | 2/1972 | Broisman | 269/29.3 |
| 3,718,587 | 2/1973 | Bhakuni | 252/8.6 |
| 3,755,261 | 8/1973 | VanGulick | 260/77.5 |
| 3,779,794 | 12/1973 | DeSantis | 117/72 |
| 3,834,934 | 9/1974 | Broisman | 117/76 T |
| 3,888,831 | 6/1975 | Kogon | 260/77.5 |
| 3,966,530 | 6/1976 | Cutts et al. | 156/308 |
| 3,991,255 | 11/1976 | Blaskiewicz et al. | 428/425 |
| 4,085,283 | 4/1978 | Den Otter et al. | 260/248 |
| 4,125,522 | 11/1978 | Becker | 528/61 |
| 4,136,219 | 1/1979 | Odam et al. | 427/385 B |
| 4,143,454 | 3/1979 | Utsunomiya | 29/460 |
| 4,158,378 | 6/1979 | Pearson et al. | 152/353 R |
| 4,240,852 | 12/1980 | Gomberg | 156/96 |
| 4,300,970 | 11/1981 | Honda et al. | 156/244.11 |
| 4,311,181 | 1/1982 | Hausch | 428/36 |
| 4,327,138 | 4/1982 | Hausch | 428/36 |
| 4,352,704 | 10/1982 | Williams | 156/126 |
| 4,399,852 | 8/1983 | Hausch | 428/36 |
| 4,401,145 | 8/1983 | Hausch | 152/353 R |

FOREIGN PATENT DOCUMENTS 1352645  5/1971  United Kingdom .

OTHER PUBLICATIONS

"Room Temperature Vulcanizing Adhesive Based on Ethylene-Propylene-Diene Terpolymer," Cantor, Uniroyal, Paper No. 18 10/10/73, Hughson Chemical Division, Lord Corporation, Products TS-2682-71.

Primary Examiner—Marion E. McCamish
Assistant Examiner—Nancy A. B. Swisher
Attorney, Agent, or Firm—Daniel N. Hall

[57] ABSTRACT

The repair of a reinforced elastomer article having a hollow therein relates to utilizing an amine curable polymer or prepolymer and a cured elastomer patch. The hollow in the elastomer as well as the areas juxtaposition to the patch is coated with a treating agent. The amine curable polymer or prepolymer is then applied to the hollow as well as to the area between the patch and the elastomer and cured at ambient temperature. One area of use is in the repair of tires.

18 Claims, 2 Drawing Figures

AMBIENT TEMPERATURE REPAIR OF ELASTOMERIC ARTICLES HAVING A HOLLOW THEREIN

TECHNICAL FIELD

The present invention relates to a composition and method for repairing reinforced elastomer articles having a hollow therein. More specifically, the present invention relates to the utilization of a patch in association with the elastomer article and an amine curable polymer or prepolymer which is cured at ambient temperatures.

BACKGROUND ART

Heretofore, reinforced rubber articles such as tires having a cut or opening therein have been repaired generally by filling the cut with uncured rubber. Such a repair required a source of heat to cure the rubber and the formed repair usually had a short life. If the opening extended through some of the cords or through the entire tire, a patch was generally used. That is, an uncured rubber compound was first added to the aperture or hole and then cured with heat. Next, the patch area, for example the inside of the tire, was buffed. An uncured patch was then positioned and cured with heat. This repair route was not only long and tedious, but required the utilization of heat, usually a tire mold, and the like. Thus, except for a chemical cure patch, an on-the-spot or in-situ repair could not be made, nor could repair be made at an ambient temperature. Moreover, the chemical patch method generally resulted in low or poor adhesion.

Considering the prior art, U.S. Pat. Nos. 3,755,261 to VanGulick; 3,888,831 to Kogon; 3,834,934 to Broisman, 3,644,256 also to Broisman; and 3,718,587 to Bhakuni relate to amine curable curing agents, amine curable polymers, or R-F-L type adhesives. However, these patents lack any suggestion of applicants' treating agent or repair of an elastomer article.

U.S. Pat. No. 3,779,794 to DeSantis relates to a moisture-curable polyurethane sealant primer system, whereas U.S. Pat. No. 4,085,283 to Den Otter relates to flame retardants utilized in cyanuric acid derivatives. Hughson Chemical Division, Lord Corporation, Product No. TS-2682-71 relates to a surface primer for elastomeric substances utilizing a proprietary compound thought to be mono-: or dichloroisocyanuric acid. An article entitled "Room Temperature Vulcanizing Adhesive Based on Ethylene-Propylene-Diene Terpolymer," Cantor, Uniroyal, Paper No. 18 presented to the Division of Rubber Chemistry of the American Chemical Society, Denver, Colo., Oct. 10, 1973, relates to various oxidants which effect ambient temperature cures of EPDM.

U.S. Pat. No. 4,136,219 to Oldam relates to a polyurethane paint which is applied to vulcanized rubbers. British Pat. No. 1,352,645 relates to a polyurethane paint which is applied to vulcanized rubbers.

British Pat. No. 1,352,645 relates to N-halogen sulphonamide treating agents which halogenize surfaces of synthetic and/or natural rubbers.

U.S. Pat. No. 4,125,522 to Becker relates to a polyurethane adhesive, whereas U.S. Pat. No. 3,966,530 to Cutts relates to triazoline diones which are utilized in lieu of chlorinated or halogenated donors for treating elastomeric surfaces to improve adhesion.

U.S. Pat. No. 4,143,454 to Utsunomiya relates to a method of attaching connecting parts of an offshore structure wherein a liquid rubber is applied over a treating solution which may contain a halogen molecule. As such, this reference lacks applicants' treating agent as well as repair of an elastomer article having a patch thereon.

U.S. Pat. No. 4,158,378 to Pearson relates to a cured rubber tire having a specific polyurethane therein and to a chlorine water treatment. Hence, Pearson also fails to teach or suggest applicants' recited treating agent as well as patched article.

U.S. Pat. No. 3,991,255 to Blaskjiewicz relates to the adhesion of a polyurethane to an EPDM surface utilizing various adhesives. However, Blaskjiewicz does not use his treating agent to form a treating layer and utilizes elevated temperatures.

U.S. Pat. No. 4,300,970 to Honda does not disclose amine curable resins or an ambient temperature cure.

U.S. Pat. No. 4,240,852 to Gomberg relates only to the use of a cyanoacrylate adhesive.

U.S. Pat. No. 4,352,704 to Williams relates to applying tire tread to a tire. This patent lacks any suggestion of applicants' treating agent or the repair of a tire aperture.

U.S. Pat. No. 4,327,138 to Hausch fails to disclose a cured rubber patch in repairing a rubber article.

One prior art method of repairing a tire relates to the utilization of a proprietary compound, thought to be a mixture of rubber and accelerators which is applied to the aperture and then cured. In general, very poor adhesion results and heat is required.

DISCLOSURE OF INVENTION

It is therefore, an aspect of the present invention to provide a repaired, reinforced elastomer article having a hollow therein utilizing a cured rubber patch and an amine curable polymer or prepolymer.

It is yet another aspect of the present invention to provide a repaired, reinforced elastomer article, as above, in which the hollow extends into or through the reinforced material and the repair is made at ambient temperatures.

It is a still further aspect of the present invention to provide a repaired, reinforced elastomer article, as above, in which a layer of a treating agent resides in said hollow and in an area between said patch and said article.

It is a still further aspect of the present invention to provide a repaired, reinforced elastomer article, as above, wherein said repaired elastomer article is a tire, a conveyor belt, and the like.

It is yet another aspect of the present invention to provide a repaired, reinforced elastomer article, as above, wherein said cured rubber patch is located juxtaposition to one end of said hollow.

It is yet another aspect of the present invention to provide a repaired, reinforced elastomer article, as above, wherein said patch has one or more cords therein.

It is yet another aspect of the present invention to provide a repaired elastomer article, as above, wherein said amine curable polymer or prepolymer is a urethane polymer or prepolymer, and wherein said treating agent is trichloroisocyanuric acid (trichloro-s-triazinetrione).

These and other aspects of the present invention will become apparent from the following description of the invention.

In general, one aspect of the invention is a repaired, reinforced elastomer article, comprising:

(a) the elastomer article, said elastomer having unsaturated groups therein, said article being cured and having a hollow therein;
(b) an elastomer patch, said patch being cured and located juxtaposition to said hollow;
(c) a treating agent, said treating agent coating said hollow and said article in said patch juxtaposition area, said treating agent selected from the group consisting of N-halohydantoins, N-haloamides, N-haloimides, and combinations thereof;
(d) an amine curable polymer or prepolymer, said amine curable polymer or prepolymer substantially filling said hollow, said amine curable polymer or prepolymer also located between said patch and said article in said juxtaposition area;
(e) said amine curable polymer or prepolymer bonded to said patch and said hollow at ambient temperature.

In general, another aspect of the invention is a process for repairing a cured, reinforced elastomer article, comprising the steps of:

(a) applying a treating agent to a hollow in the elastomer article, to a patch area, and to a cured elastomer patch, said patch area located on at least one side of said article and juxtaposition to said hollow, said elastomer having unsaturated groups therein, said treating agent selected from the group consisting of N-halohydantoins, N-haloamides, N-haloimides, and combinations thereof;
(b) applying said patch juxtaposition to said patch area;
(c) applying an amine curable polymer or prepolymer system to said hollow and to said patch area between said patch and said article; and
(d) curing said amine curable polymer or prepolymer at ambient temperature.

BEST MODE FOR CARRYING OUT THE INVENTION

According to the concepts of the present invention, a reinforced elastomer article having a hollow therein is repaired in association with a cured rubber patch. The hollow, that is the recess or void exists in the article and extends at least into the reinforced area such that some of the cords, that is at least approximately 25 percent, are damaged, broken, or severed. When the hollow extends only into the cord area, a cavity is formed in the article. When the article extends entirely through the article, an aperture is formed. In either case, an amine curable polymer or prepolymer is applied to the hollow and to a space between the rubber elastomer and cured rubber patch. Cure occurs at ambient temperature.

Figure 1:
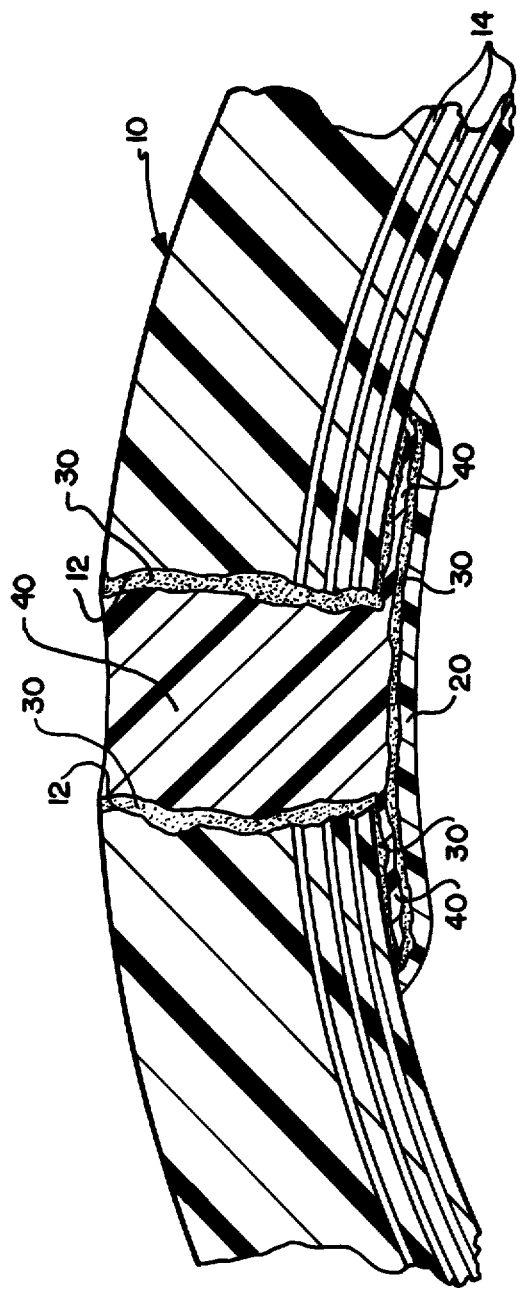
FIG. 1 relates to a cross-sectional view showing the repair of a reinforced elastomeric article having an aperture extending therethrough, according to the present invention.

According to the embodiment of FIG. 1, article 10 has hollow 12 in the form of an aperture, or the like and extends clearly therethrough. The article to be repaired, or substrate, is a cured rubber or elastomer, having unsaturated groups therein. The substrate typically has cords 14 therein. The substrate can be any conventional elastomer or rubber known to those skilled in the art. For example, it can be made from conjugated dienes having from 4 to 12 carbon atoms such as butadiene, isoprene, and the like. It can also be made from natural rubber, that is from a substance which is obtained from various trees and plants which grow in the tropics or desert portions of the world. Such natural rubber generally has in excess of 90 and usually in excess of 95 percent of cis-1,4-polyisoprene content. The substrate may also be various elastomeric copolymers such as those made from monomers of conjugated dienes having from 4 to 12 carbon atoms as set forth above, and vinyl substituted aromatic compounds having from 8 to 15 carbon atoms. Examples of such vinyl substituted aromatic compounds include styrene, alpha-methylstyrene, and the like. An example of a specific copolymer is styrene-butadiene rubber.

Naturally, other types of rubber compounds can be utilized such as the so-called butyl rubbers, neoprene, that is polychloroprene, and the like, as well as blends of said above rubbers.

The preparation of such above noted various elastomers is well known to the art. The article to be repaired is often in the form of a tire, especially an off-the-road tire, a conveyor belt, or any rubber article having a hollow therein. Regardless of the type or nature of the article in which the elastomer exists as a cured form, it is desirable to clean the surface to which the amine curable polymer is to be applied. Cleaning can take place as through a physical treatment of the area to be repaired, for example, as through buffing or through skiving, that is cutting and removing a portion of the surface. Another method involves the use of any conventional organic solvent to remove dirt and residue. Typical solvents include acetone, or ethyl acetate. As apparent from the drawing, the area which is typically cleaned involves aperture 12, the area adjacent to patch 20 and the patch as well. Thus, the aperture may be difficult to clean by physical means, can be cleaned by utilizing a solvent whereas the bottom portion of the article can be buffed. To ensure removal of all loose rubber, the buffed portion can then be cleaned with a solvent.

To the cleaned surfaces are applied a coating of various treating agents 30 which have been found to improve adhesion between the substrate and the amine curable polymer or prepolymer 40. Suitable treating agents include the various N-halohydantoins, the various N-haloamides, the various N-haloimides, and combinations thereof. Examples of various desirable N-halohydantoins include 1,3-dichloro-5,5-dimethyl hydantoin; 1,3-dibromo-5,5-dimethyl hydantoin; 1,3-dichloro-5-methyl-5-isobutyl hydantoin; and 1,3-dichloro-5-methyl-5-hexyl hydantoin. Examples of N-haloamides include N-bromoacetamide and tetrachloroglycoluril. Examples of N-haloimides include N-bromosuccinimide and the various chloro substituted s-triazinetriones, commonly known as mono-, di-, and trichloroisocyanuric acids. A preferred treating composition for use in the practice of the present invention are the various mono-, di-, or trichloroisocyanuric acids, or combinations thereof. Trichloroisocyanuric acid is especially preferred.

The treating agents usually exist in solid form. They are readily soluble in solvents such as acetone and the like and thus can be applied in liquid form. Application of the treating agent generally occurs at ambient temperatures. Application can occur through any conventional manner as through brushing, spraying, and the like. The amount applied is such that the rubber substrate surface is coated. Preferably, two or more coats of the treating agent or adhesive compound is used to ensure that all the cured rubber substrate surface has been coated.

A typical amount of the treating agent in the suitable solvent, for example ethyl acetate or acetone is generally from about 0.1 to about 10 percent by weight based upon the total weight of said treating agent and solvent, and preferably from about 0.5 percent to about 5 percent. Of course, higher or lower concentrations can be utilized. This solvent system has been found to dry within a matter of minutes so that the amine curable polymer or prepolymer can be bonded thereto. It is thought that the adhesive treating system adds halogen groups, for example, chlorine to the cured rubber which activates the cured rubber surface allowing the amine curable polymer or polymer system to adhere strongly to the cured rubber surface.

Of the various amine curable polymers or prepolymers, the urethanes are preferred. Other prepolymers or polymers which can be cured with the amine curing agent include the compounds set forth in U.S. Pat. No. 3,755,261 which is hereby fully incorporated by reference. Briefly, such compounds are the various epoxy resins such as those disclosed in the "Encyclopedia of Polymer Science and Technology" Interscience Publishers, New York (1967), Volume 6, pages 212–221; halogen-containing hydrocarbon polymers such as chloroprene polymers, chlorinated butyl rubber, and chlorinated polyethylene and polypropylene; chlorosulfonated polymers such as those described in U.S. Pat. No. 2,723,257; polymers containing acid halide groups such as

and haloformate groups such as

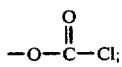

polymers containing anhydride groups which on reaction with diamines yield amide-acid linkages, and organo-polysiloxanes as described in U.S. Pat. No. 2,938,010.

The urethane prepolymers or polymers, that is those which contain isocyanate groups, are generally formed by first reacting a polyether polyol or a polyester polyol with a molar excess of a diisocyanate to form a prepolymer having terminal isocyanate groups. The polymer is then cured to increase its molecular weight from less than about 3,000 upwards to over 10,000. Examples of such polymers are set forth in U.S. Pat. Nos. 2,620,516; 2,777,831; 2,843,568; 2,866,774; 2,900,368; 2,929,800; 2,948,691; 2,948,707; and 3,114,735, all of which are hereby fully incorporated by reference. Typical specific examples of such polyurethanes include Adiprene L-367, polytetramethylene ether glycol containing approximately 6.4 percent isocyanate end groups by weight, manufactured by DuPont; Adiprene L-42, polytetramethylene ether glycol containing approximately 2.8 percent isocyanate end groups by weight, manufactured by DuPont; and Cyanaprene A-7, a polyester-based coating polymer with approximately 2.4 percent isocyanate end groups, manufactured by American Cyanamid. Blends of these polyurethanes can also be utilized. Moreover, it has been found, particularly with repair or application of the amine curable polymer to the patch area, that is the area between patch 20 and cured substrate 11, better adhesion is often obtained by utilizing two different types of urethane. For example, a urethane containing a high amount by weight of isocyanate end groups such as Adiprene L-367 can be blended with a urethane containing a low amount by weight of isocyanate end groups such as Adiprene L-42. The amount of one urethane to the other can range from about 1 to about 99 percent and desirably from about 30 to about 70 percent by weight.

To the amine curable prepolymer or polymer compound is added a conventional amine curing agent, known to those skilled in the art. Generally, any conventional or known amine curing agent can be used and, thus, only a few specific examples will be given. Thus, the curing agent can be MOCA, that is 4,4'-methylene bis(2-chloroaniline) or, desirably a complex of 4,4'-methylene dianiline and a salt, or a complex of racemic 2,3-di-(4-aminophenyl) butane and a salt, as set forth in U.S. Pat. No. 3,755,261 to VanGulick which is hereby fully incorporated by reference. The latter two complexes are preferred. The methods for preparing the complexes are set forth in U.S. Pat. No. 3,755,261. A preferred salt utilized with the 4,4'-methylene dianiline compound is sodium chloride or lithium chloride. Due generally to availability and costs, the complexes or salts derived from 4,4'-methylene dianiline are highly preferred. Another class of amine curing agents which can be utilized are the various Versamides, that is the condensation products of polyamines and dibasic acids obtained when certain unsaturated fatty acids are polymerized, and are manufactured by Henkel Chemical Company.

The equivalent weight of the curing agent utilized with regard to the curable prepolymer or polymer, including the amine curing agent, generally ranges from about 85 percent to 115 percent with from about 95 to 105 percent being preferred.

Often to facilitate processing, the curing agent, and especially an amine curing agent such as the complex of 4,4'-methylene dianiline and a salt is utilized with a plasticizer such as dioctylphthalate on a 50 percent weight basis, or Flexol 4-GO, tetraethylene glycol bis(2-ethyl hexanoate) manufactured by Union Carbide Corporation on a 50 percent weight basis. The amount of plasticizer can range from about 20 percent to about 60 weight percent.

The curing agent is blended with the prepolymer or polymers in various mixers such as dough mixers, high speed impellers, paddle-type mixers, and the like. Small batches can be mixed by stirring with a spatula. Usually, the prepolymer or polymer is a liquid. If not, when mixed with the polar solvent, a liquid mixture results. However, even if a solid curing agent is used, when added to the prepolymer or the polymer, and to a solvent system, a liquid system results even though the curing agent (e.g., amine) can be in the form of a dispersion. Thus, even though the system may contain solids therein, the solids exist in the form of a dispersion so that a liquid system is produced.

The curing agent and the amine curable polymers or prepolymers form the curable polymer system which is mixed with a polar solvent so that a liquid system is obtained which cures at ambient or room temperature, that is, the prevailing temperature as from about 10° C. to about 50° C. Often the ambient temperature will range from about 15° C. to about 35° C. or 40° C. The polar solvents which can be utilized, especially with the amine curing agent and the amine polymers or prepolymers are, for example, set forth in U.S. Pat. No. 3,888,831 to Kogon which is hereby fully incorporated by reference. Generally, the amount of solvent utilized per 100 parts by weight of the curable prepolymer or polymer ranges from about 2 to about 40, desirably from about 2 to about 20, and preferably from about 5 to about 15 parts by weight. Specific examples of preferred solvents include dimethylformamide, tetrahydrofuran, cyclohexanone, ethyl acetate, nitromethane, nitroethane, nitropropane, methyl ethyl ketone, and acetone. Acetone and methyl ethyl ketone are highly preferred. The amount of curing agent, based upon said polymer or prepolymer, ranges from about 0.85 to about 1.15 equivalents.

Considering patch 20, it can generally be of any desired size so long as it is greater in surface area than the aperture adjacent thereto. Typically, the surface area of the patch is at least twice as great as the aperture. Generally, an appropriate patch size will be known to one skilled in the art of patch construction and/or patch application. The patch is made of rubber and is generally fully cured. Although cured natural rubber or a composition containing at least 80 percent by weight of natural rubber is often preferred, any conventional type of cured rubber compound can be utilized. Thus, the patch can be made substantially from a conjugated diene having from 4 to 12 carbon atoms, copolymers made from conjugated dienes having from 4 to 12 carbon atoms with vinyl substituted aromatics having from 8 to 15 carbon atoms, for example styrene-butadiene rubber, and the like. In essence, the patch can be made out of the same type of rubber as the substrate. Often, the patch will have a cushioned layer thereon to alleviate stresses formed between the tire carcass and tire patch.

Since in the preferred embodiment of the present invention the substrate has cords therein, desirably the patch also has cords therein. Although the number of the cords can range from a small number to a very large number, the strength of the cords in the patch is generally at least equal to the strength of the preinjured damaged cords contained in the substrate. More specifically, whenever approximately 25 percent to about 50 percent of the cords are damaged, severed, broken, etc., the strength of the cords in the patch is approximately equal to the strength of said cords before being damaged, etc. However, should approximately 50 percent to 100 percent of all the cords be damaged, severed, or otherwise injured, the strength of the cords in the patch is equal to the strength of the total cords in the article before any injury thereto. Should the number of damaged cords in the article be less than approximately 25 percent, then, the strength of the remaining cords is usually adequate such that a reinforced patch need not be utilized. The cords in the patch can be made of polyester, nylon, steel, rayon, and the like, with nylon being preferred. It has been found that according to the present invention, large apertures extending through a cured rubber substrate can be repaired up to approximately eight inches in diameter.

Generally, any rubber article having an aperture therethrough can usually be repaired by the present invention. Specific examples include conveyor belts, tires, especially off-the-road tires such as those utilized for front-end loaders, mining equipment machines, and the like.

Figure 2:
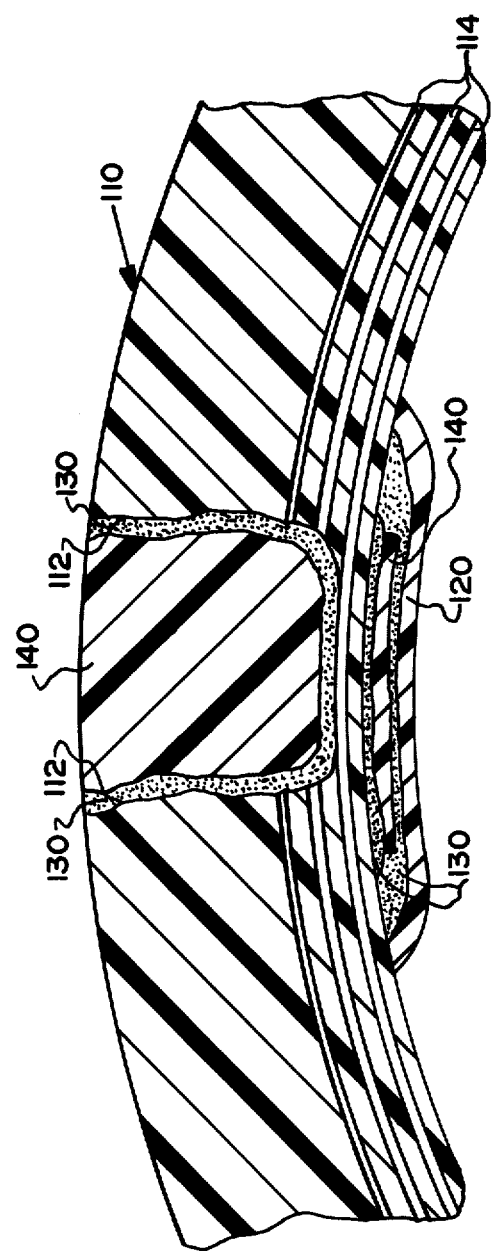
FIG. 2 relates to a cross-sectional view showing the repair of a reinforced elastomer article having a cavity extending into the cord area, according to the present invention.

A repaired article having a hollow in the form of an aperture is shown in FIG. 2. An amine cured polymer or prepolymer, as for example a urethane cured polymer 40, fills the aperture. It also forms a good adhesive bond with treating agent 30 which in turn coats the aperture 12 of substrate 10, patch 20, and the adjacent article area. The amine cured urethane extends through the aperture and into the patch area, that is the area juxtaposition to the patch or located between the patch and the substrate. In this area, a good bond is also formed such that the patch reinforces the substrate. When the rubber article is a tire, usually the patch area is buffed sufficiently to remove surface contamination. The inner liner should at least be buffed and in some cases removed to the tie-gum layer in order to obtain a fresh surface. Occasionally, it is desirable to even remove one or two of the cord plies in order to ensure a fresh surface for bonding. Reinforcing patch 20 can contain a plurality of cords therein, generally approximately equal in strength to the total number of cords in the tire to be repaired. The patch is coated with the treating agent and then coated with the amine curable polymer or prepolymer. The patch is then taped into place over the aperture area. The patch is also held in place by inflating a curing tube located inside the tire. With the aperture of the tire located in the uppermost vertical position, the amine curable polymer or prepolymer is poured into the aperture until it is filled. Of course, the aperture has previously been coated with the treating agent. The top of the aperture is then taped and the amine curable polymer in the patch area and in the aperture is allowed to cure at ambient temperature. Taping of the aperture area retains the polar solvent such as acetone which promotes curing of the polymer. In a variation of this procedure, the amine curable polymer is applied to the patch area and then the patch applied thereto. The patch is taped into place and the polymer is allowed to cure. Next, the amine curable polymer is separately added to the aperture so that it is filled and then taped thereover. The aperture portion of the repair is then separately cured at ambient temperatures. The end result by either method is a repaired article having much better strength and durability than that repaired according to theretofore conventional methods that are performed on site.

In the embodiment of FIG. 2, the hollow is in the form of a cavity wherein some cords of the reinforced article have been damaged, severed, or the like. Usually, at least 25 percent of the cords have been broken, damaged, etc., and the article is repaired utilizing a patch. Either the cavity can be filled or the patch applied first. In repair of cavity 112, treating agent 130 is applied to all surfaces thereof. Then, the cavity is filled with amine curable polymer 140, generally to the level of the substrate. Naturally, in this operation, the cavity is located in the uppermost vertical position of the article. As before, the tape is then applied over the filled cavity to promote curing of the polymer. Cure occurs at ambient temperature.

The patch area is prepared as before by cleaning and even buffing down to the tie-gum layer and even to the cord ply layer. Treating agent 130 is applied to the patch area of substrate 110 as well as to one side of patch 120. Amine curable polymer or prepolymer 140 is then applied to the treated side of the patch, with the patch in turn being applied to the treated portion of substrate 110. The ends of the patch can be taped to the substrate or held in place with a curing tube located inside the tire. The number of cords of the patch is as previously set forth. That is, if less than 25 percent of the cords are damaged, the use of the patch having cords therein is optional. When approximately 25 to about 50 percent of the cords are damaged, severed, etc., the strength of the cords in the patch is at least equal to the strength of such cords before being damaged. When approximately 50 percent or more of the cords are damaged, injured, broken, etc., the strength of the cords in the patch is equal to the strength of the total number of cords in the substrate before any injury thereto. The repair is then cured at ambient temperature.

In forming the amine curable polymer system, generally the amine curable polymer or prepolymer is mixed with the polar solvent and then the curing agent is added last. During cure, an effective and strong bond is formed between the prepolymer or polymer system and the treated elastomer substrate. Since the present invention relates to an ambient temperature, repair of large and cumbersome articles such as off-the-road tires, conveyor belts, and the like, can be made in situ. In other words, the repair can be made at the job site. The only accessory which may be required is a tire bladder, although a sand bag can be used. In such a situation, the repair can be made at the local tire repair shop. Since the cure is ambient, no steam chambers, or other vulcanizable tire repair equipment are required. This, of course, also results in an energy savings.

It is to be understood that various conventional additives in typical amounts can be added to the amine curing agent and prepolymer system such as colorants, softeners, fillers, antioxidants, plasticizers, and the like.

The invention will be better understood by reference to the following representative examples.

EXAMPLE 1

A damaged off-the-road tire, having the injury through the innerliner, was repaired as follows. The damaged area was skived out, making sure to remove all of the damaged area, body plies, and lug areas. The repair area was then buffed to an RMA #3 or #4 buff rating. The innerliner was also buffed. In most cases, the innerliner must be at least removed to the tie-gum. In some cases, removal of one or two of the body plies was necessary in order to get a good fresh surface for bonding of the reinforced patch. Once both areas have been buffed, they were thoroughly washed with a solvent, normally acetone on a piece of Rymplecloth. The acetone was allowed to dry thoroughly. Application of several coats of a 3 percent trichloro-s-triazinetrione in ethyl acetate follows the washing procedure. This likewise was allowed to dry thoroughly. Installation of the reinforcing patch was preferably done first. This was accomplished by mixing a polyurethane repair kit comprised of the following two components.

| COMPONENT A | | COMPONENT B | |
|---|---|---|---|
| Adiprene L-42 | 150 grams | Caytur 21 | 72 grams |
| Adiprene L-367 | 150 grams | | |
| Flexol 4G0 | 30 grams | | |
| Acetone | 30 grams | | |

The thoroughly mixed polyurethane was then coated onto a reinforcing patch that was fully cured and contained no uncured gum layer. The patch was buffed, washed and primed with the 3 percent trichloro-s-triazinetrione prior to the application of the polyurethane. After the patch was coated, the buffed portion of the innerliner was also coated. The polyurethane was allowed to thicken to a nonflowing material before installation of the patch to the innerliner was carried out. The patch was taped in place and then held permanently in place by inflating a curing tube inside the tire. After the patch was secured, the tire was rotated 180° so that the aperture was at the top of the tire. Additional polyurethane repair material was poured into the aperture until completely full. The surface of the repair was covered with tape in order to keep the fluid material in place and allow the acetone to remain in the formulation long enough to fully cure the system. After standing 24 hours at ambient temperature, the tape was removed from the aperture and the curing tube and tape were removed from the innerliner position of the tire. The tire was ready to be placed back into service.

The above procedure was performed on a 37.25×35 scrapper tire. The size of the injury was a 4 inch inside diameter on the innerliner and 10½ inch outside diameter on the exterior (tread) surface. The injury was located in the crown area. A ROCO #7 patch was used (Rocson, Inc., Copley, Ohio). The patch was fully cured. After the tire was repaired, it was replaced back into service. The repair lasted 342 hours before a small air leak occurred.

While various preferred embodiments of the present invention, as well as the best mode thereof have been described in detail, in accordance with the patent statutes, it is to be understood that the invention is measured by the scope of the attached claims.

What is claimed is:

1. A repaired, reinforced elastomer article, wherein said repair contains an elastomer patch and a cured amine curable polymer or prepolymer essentially free of rubber filler, comprising:

(a) the elastomer article, said elastomer having cords therein and having unsaturated groups therein, said article being cured and having a hollow therein;

(b) the elastomer patch, said patch having cords therein and being cured and located juxtaposition to said hollow;

(c) a treating agent, said treating agent coating said hollow and said article in said patch juxtaposition area, said treating agent selected from the group consisting of N-halohydantoins, N-haloamides, N-haloimides, and combinations thereof;

(d) the cured amine curable polymer or prepo selected from the group consisting of (a) epoxy resins; (b) halogen-containing hydrocarbon polymers; (c) chlorosulfonated polymers; (d) polymers containing acid halide groups such as

or haloformate groups such as

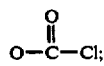

(e) polymers containing anhydride groups which, on reaction with diamines, yield amide-acid linkages, (f) organopolysiloxanes; (g) urethane polymers or prepolymers; and combinations thereof, said amine curable polymer or prepolymer substantially filling said hollow, said amine curable polymer of prepolymer also located between said patch and said article in said juxtaposition area;

(e) said cured amine curable polymer or prepolymer bonded to said patch and said hollow at ambient temperature.

2. A repaired elastomer article according to claim 1, wherein said treating agent is selected from the group consisting of 1,3-dichloro-5-5-dimethyl hydantoin; 1,3-dichloro-5-methyl-5-isobutyl hydantoin; 1,3-dichloro-5-methyl-5-hexyl hydantoin; N-bromoacetamide; tetrachloroglycoluril; N-bromosuccinimide, and mono-, di-, or trichloroisocyanuric acid.

3. A repaired elastomer article according to claim 2, wherein said ambient temperature cure of said amine curable polymer or prepolymer occurs at a temperature of from about 10° C. to about 50° C.

4. A repaired elastomer article according to claim 3, wherein said treating agent is selected from the group consisting of monochloroisocyanuric acid, dichloroisocyanuric acid, trichloroisocyanuric acid, and combinations thereof.

5. A repaired elastomer article according to claim 4, wherein said amine cured polymer or prepolymer is said urethane polymer or prepolymer and wherein said amine curable polymer or prepolymer cures at a temperature of from about 15° C. to about 30° C.

6. A repaired elastomer article according to claim 5, wherein said hollow is an aperture, and wherein the number of cords in said patch is approximately equal to or greater than the strength of the cords in said elastomer article, and wherein said elastomer article is a tire.

7. A repaired elastomer article according to claim 5, wherein said hollow is a cavity, wherein said cavity contains approximately 25 to about 50 percent of broken or severed cords, and wherein the strength of the cords in said patch is approximately equal to or greater than the strength of said cords before being damaged.

8. A repaired elastomer article according to claim 5, wherein said hollow is a cavity, wherein said cavity contains approximately 50 percent to about 100 percent of broken or severed cords, and wherein the strength of the cords in said patch is approximately equal to or greater than the strength of said cords in said article.

9. A process for repairing a cured, reinforced elastomer article wherein said repair contains an elastomer patch and a cured amine curable polymer or prepolymer essentially free of rubber filler, comprising the steps of:

(a) applying a treating agent to a hollow in the elastomer article having cords therein, to a patch area, and to the cured elastomer patch, said patch area located on at least one side of said article and juxtaposition to said hollow, said elastomer having unsaturated groups therein, said treating agent selected from the group consisting of N-halohydantoins, N-haloamides, N-haloimides, and combinations thereof;

(b) applying said patch having cords therein juxtaposition to said patch area;

(c) applying the amine curable polymer or prepolymer system to said hollow and to said patch area between said patch and said treating agent, said amine curable polymer or prepolymer selected from the group consisting of (a) epoxy resins; (b) halogen-containing hydrocarbon polymers; (c) chlorosulfonated polymers; (d) polymers containing acid halide groups such as

or haloformate groups such as

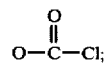

(e) polymers containing anhydride groups which, on reaction with diamines, yield amide-acid linkages, (f) organopolysiloxanes; (g) urethane polymers or prepolymers; and combinations thereof; and (d) curing said amine curable polymer or prepolymer at ambient temperature.

10. A process according to claim 9, wherein said amine curable polymer or prepolymer system comprises a polar solvent, an amine curable polymer or prepolymer, and an amine curing agent, said polar solvent is selected from a compound having dipole moments in excess of 0.4 debye in which there are no more than a total of 8 $CH_3-$, $CH_2$, or tertiary carbon radicals per polar group contained in said compound, benzene, and biphenyl.

11. A process according to claim 10, wherein said treating agent is selected from the group consisting of 1,3-dichloro-5,5-dimethyl hydantoin; 1,3-dichloro-5-methyl-5-isobutyl hydantoin; 1,3-dichloro-5-methyl-5-hexyl hydantoin; N-bromoacetamide; tetrachloroglycoluril; N-bromosuccinimide, mono-, di-, or trichloroisocyanuric acid, and wherein said ambient temperature cure is at a temperature of from about 10° to about 50° C.

12. A process according to claim 11, wherein said treating agent is selected from the class consisting of monochloroisocyanuric acid, dichloroisocyanuric acid, trichloroisocyanuric acid, and combinations thereof, and wherein said polar compound ranges from about 2 to about 40 parts per 100 parts of said prepolymer or polymer and is selected from the group consisting of esters, ketones, ethers, halogenated hydrocarbons, tertiary amines, nitrile paraffins, fully substituted amides, sulfones, sulfoxides, and sulfides.

13. A process according to claim 12, wherein said amine curable polymer or prepolymer is said urethane polymer or prepolymer.

14. A process according to claim 13, wherein said polar solvent is selected from the group consisting of dimethylformamide, tetrahydrofuran, cyclohexanone, ethyl acetate, methyl ethyl ketone, and acetone, and wherein said amine curing agent is selected from the group consisting of (a) 4,4'-methylene bis(2-chloroaniline), (b) a complex of 4,4'-methylene dianiline and a salt, said salt being selected from the group consisting of sodium chloride, sodium bromide, sodium iodide, sodium nitrite, lithium chloride, lithium bromide, lithium iodide, lithium nitrite, and sodium cyanide, (c) a complex of racemic 2,3-di-4(aminophenyl)butane with a salt, said salt selected from the group consisting of sodium chloride, sodium bromide, sodium iodide, potassium chloride, potassium bromide, potassium iodide, cesium chloride, cesium bromide, and cesium iodide, the ratio of said dianiline or said butane to said salt in said complex being 3 moles to 1 mole, the equivalent amount of said curing agent based upon said prepolymer or polymer ranging from about 0.85 to about 105.

15. A process according to claim 14, wherein said hollow is an aperture, and wherein the cords in said aperture are of a strength approximately equal to or greater than the strength of cords in said article.

16. A process according to claim 14, wherein said hollow is a cavity, wherein said cavity contains approximately 25 to about 50 percent of broken or severed cords, and wherein the strength of cords in said patch is approximately equal to the strength of said broken cords before being broken.

17. A process according to claim 14, wherein said hollow is a cavity, wherein said cavity has from 50 to about 100 percent of broken or severed cords, and wherein the strength of cords in said patch is approximately equal to or greater than the strength of said cords in said article.

18. A process according to claim 15, wherein said elastomer article is a tire.

* * * * *